(12) United States Patent
Hayashi (10) Patent No.: US 6,792,453 B1
(45) Date of Patent: Sep. 14, 2004

(54) INFORMATION TERMINAL UNIT, CHARACTER INPUT CONTROL METHOD TO BE USED IN THE SAME, AND STORAGE MEDIUM RECORDING CONTROL PROGRAM THEREFOR

(75) Inventor: Keiichi Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 690 days.

(21) Appl. No.: 09/615,059

(22) Filed: Jul. 12, 2000

(30) Foreign Application Priority Data

Jul. 14, 1999 (JP) .......................................... 11-199723

(51) Int. Cl.[7] .............................................. G06F 13/00
(52) U.S. Cl. ....................... 709/219; 719/329; 715/513
(58) Field of Search .............................. 709/217, 219; 719/328, 329; 715/501.1, 513

(56) References Cited

U.S. PATENT DOCUMENTS 6,043,760 A * 3/2000 Laakkonen ................... 341/22

FOREIGN PATENT DOCUMENTS

GB        2345614 A       7/2000

OTHER PUBLICATIONS

British Search Report dated Sep. 28, 2000.

* cited by examiner

*Primary Examiner*—Viet D. Vu
(74) *Attorney, Agent, or Firm*—McGinn & Gibb, PLLC (57) ABSTRACT

An information terminal unit is capable of inputting a desired character with lesser key stroke by eliminating unnecessary operation of a user. The information terminal unit obtains a file described by a page description language used on a browser function on a superior unit by means of the browser function, parses the page description language of the obtained file, and displays a result of parsing of the page description language. The information terminal unit has control means for dynamically controlling an order of appearance of display characters upon inputting character, depending upon an attribute of a kind of input character designated in a character input tag used in the page description language.

26 Claims, 5 Drawing Sheets

`<INPUT TYPE=text NAME="NAME" CHARTYPE=KANJI CHARSEQ=(*:1,#:2)><BR>`

FIG.3B

`<INPUT TYPE=text NAME="ADDRESS" CHARTYPE=KANJI CHARSEQ=(*:1,#:2)><BR>`

FIG.3C

`<INPUT TYPE=text NAME="TELEPHONE NUMBER" CHARTYPE=NUM><BR>`

FIG.3D

`<INPUT TYPE=text NAME="MAIL ADDRESS" CHARTYPE=ANK CHARSEQ=(*:4,#:5)><BR>`

FIG.3E

`<INPUT TYPE=password SIZE=8 CHARTYPE=ANK><BR>`

FIG.4

INFORMATION TERMINAL UNIT, CHARACTER INPUT CONTROL METHOD TO BE USED IN THE SAME, AND STORAGE MEDIUM RECORDING CONTROL PROGRAM THEREFOR

BACKGROUND OF THE INVENTION

1. Field of the Invention

The present invention relates generally to an information terminal unit, a character input control method to be used in the same, and a storage medium recording a control program therefor. More particularly, the invention relates to a character input control method in a portable information terminal unit, such as a portable telephone unit or the like.

2. Description of the Related Art

Conventionally, among portable information terminal units, such as portable telephone units or the like, there are some units having a browser function to be used for internet, obtaining a HTML DATA (Hyper Text Markup Language) file on a web server, parsing the obtained HTML DATA, and displaying a result of parsing of the HTML DATA on a display portion.

Here, the browser function is a function to be used for seeing overview of data group and object group and taking out information.

In this case, in the foregoing portable telephone unit, even when user of the portable telephone performs operation for recitation relating to character input in the obtained HTML DATA, character input is activated with a given kind of character according to a standard in portable telephone unit.

Therefore, upon performing character input adapting to gist of the HTML, kind of the input character is judged by the user of the portable telephone to perform character input by switching of the kind of the input character by a key. For the keys of the portable telephone unit, a plurality of kinds of characters are assigned. For example, a key, to which a number "1" is assigned, is also assigned Japanese-Hiragana or Japanese-Katakana character of row of "A" so that the number and Japanese-Hiragana or Japanese-Katakana characters are selectively used. For example, the row of "A" is composed of the character of "A", "I", "U", "E" and "O".

On the other hand, upon performing character input, order of appearing characters to be displayed in response to depression of the key is constant in the cellular phone unit and cannot be controlled the order of appearance dynamically depending upon external factor, such as HTML DATA or so forth.

As set forth above, in the conventional portable information terminal device, upon inputting the character, number of times of key operation, such as depression of key up to switching of kind of character or to input the desired character, depending upon the external factor of the HTML DATA or the like, becomes large to trouble the user, make operability low, and make load on the user heavy.

SUMMARY OF THE INVENTION

The present invention has been worked out in view of the problems set forth above. Therefore, it is an object of the present invention to provide an information terminal unit, a character input control method to be used in the same and a storage medium recording a control program therefor, which permits inputting of a desired character with lesser key strokes.

According to the first aspect of the present invention, an information terminal unit for obtaining a file described by a page description language used on a browser function on a superior unit by means of the browser function, parsing the page description language of the obtained file, and displaying a result of parsing of the page description language, comprises:

control means for dynamically controlling an order of appearance of display characters upon inputting character, depending upon an attribute of a kind of input character designated in a character input tag used in the page description language.

According to the second aspect of the present invention, a character input control method for obtaining a file described by a page description language used on a browser function on a superior unit by means of the browser function, parsing the page description language of the obtained file, and displaying a result of parsing of the page description language, comprises:

a step of dynamically controlling an order of appearance of display characters upon inputting character, depending upon an attribute of a kind of input character designated in a character input tag used in the page description language.

According to the third aspect of the present invention, a storage medium recording a character input control program for obtaining a file described by a page description language used on a browser function on a superior unit by means of the browser function, parsing the page description language of the obtained file, and displaying a result of parsing of the page description language, comprises:

a step of dynamically controlling an order of appearance of display characters upon inputting character, depending upon an attribute of a kind of input character designated in a character input tag used in the page description language.

According to the fourth aspect of the present invention, a portable telephone unit for obtaining a file described by a page description language used on a browser function on a superior unit by means of the browser function, parsing the page description language of the obtained file, and displaying a result of parsing of the page description language, comprises:

control means for dynamically controlling an order of appearance of display characters upon inputting character, depending upon an attribute of a kind of input character designated in a character input tag used in the page description language.

According to the fifth aspect of the present invention, a character input control method for a portable telephone unit for obtaining a file described by a page description language used on a browser function on a superior unit by means of the browser function, parsing the page description language of the obtained file, and displaying a result of parsing of the page description language, comprises:

a step of dynamically controlling an order of appearance of display characters upon inputting character, depending upon an attribute of a kind of input character designated in a character input tag used in the page description language.

According to the sixth aspect of the present invention, a storage medium recording a character input control program for controlling character input to a portable telephone unit for obtaining a file described by a page description language used on a browser function on a superior unit by means of the browser function, parsing the page description language of the obtained file, and displaying a result of parsing of the page description language, the character input control program comprises:

a step of dynamically controlling an order of appearance of display characters upon inputting character to the portable telephone unit, depending upon an attribute of a kind of input character designated in a character input tag used in the page description language.

In the construction set forth above, the information terminal unit is a unit or device which has a browser function for obtaining the HTML (Hyper Text Markup Language) data or file on the server and a display portion capable of paring the HTML data or file and displaying the result of parsing.

In the shown unit, upon parsing the received HTML data or file, with respect to the character input tag in the obtained HTML data or file, the order of appearance of the character to be displayed is controlled dynamically upon inputting the characters depending upon the attribute of the kind of the input character designated by the character input tag.

By this, the information terminal unit or the portable telephone unit according to the present invention performs parsing and display of the received HTML data or file. When the user performs operation relating to the character input in the HTML, it becomes possible to set the order of the characters to be displayed adapting to the kind of the character or the gist described on the HTML data or file without requiring any operation of the user therefor.

On the other hand, in the information terminal unit or the portable telephone unit according to the present invention, since the order of appearance of the characters can be modified adapting to the content described on the HTML data or file, the desired character can be reached with lesser strokes of the keys or buttons.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
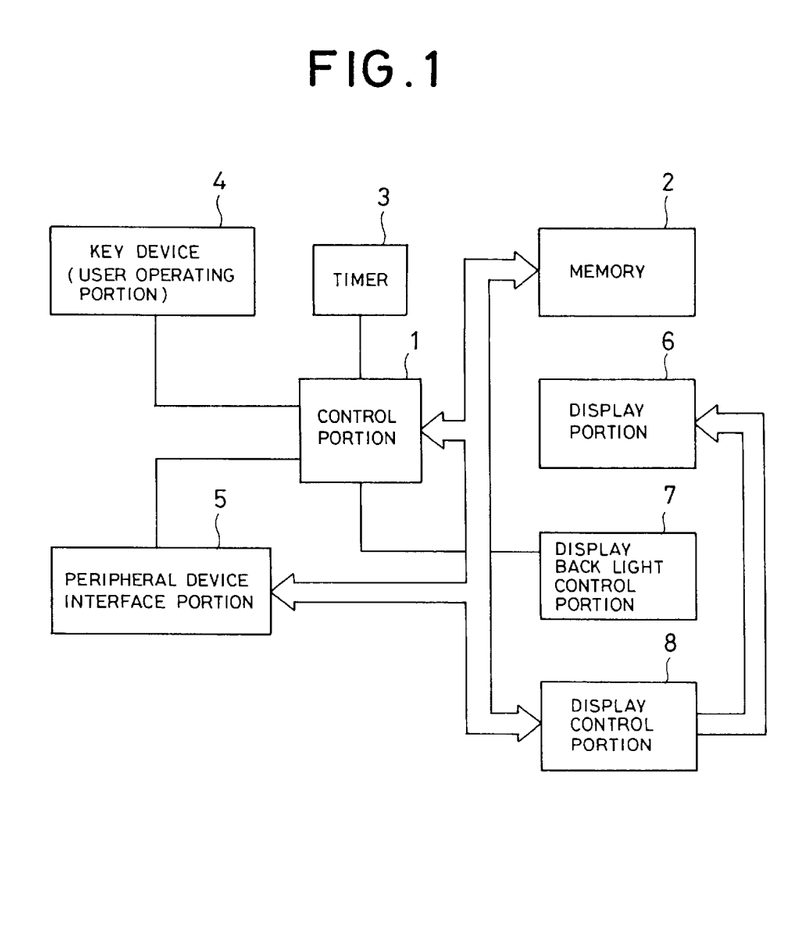
FIG. 1 is a block diagram showing a construction of one embodiment of an information terminal unit according to the present invention.

FIG. 1 is a block diagram showing a construction of one embodiment of an information terminal unit according to the present invention. In FIG. 1, one embodiment of the information terminal unit according to the present invention is constructed with a control portion 1, a memory 2, a timer 3, a key device (user operating portion) 4, a peripheral device interface portion 5, a display portion 6, a display backlight control portion 7 and a display control portion 8.

The control portion 1 performs control for respective portions in the information terminal unit. The memory 2 stores a program to be executed by the control portion or obtained HTML DATA (Hyper Text Markup language) or the like of the web site.

The timer 3 measures an elapsed time and performs measurement of a predetermined period according to control of the control portion 1. The key device 4 is to be operated by the user for transmitting a key information of the key depressed by the user to the control portion 1.

The peripheral device interface portion 5 performs inputting and outputting of data between the peripheral device (not shown) connected to the information terminal device, and the information terminal device. The display portion 6 is adapted to display characters, signs, image or so forth depending upon control of a display control portion 8. The display back light control portion 7 controls a back light (not shown) mounted on the display portion 6. The display control portion 8 feeds a display information to the display portion 6 under control of the display control portion 8.

Figure 2:
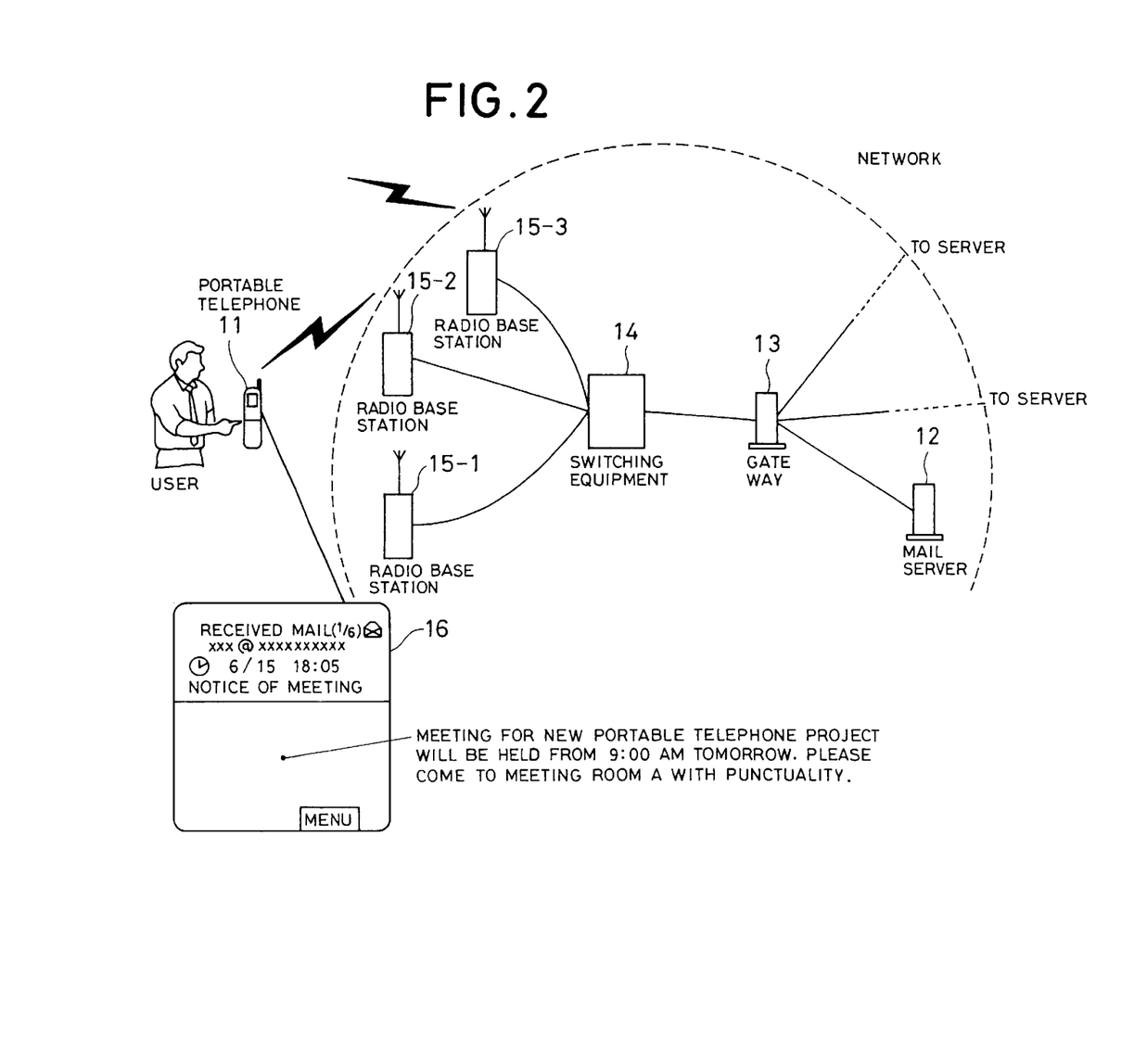
FIG. 2 is a block diagram showing a system construction of one embodiment of the information terminal unit according to the present invention.

FIG. 2 is a block diagram showing a system construction of one embodiment of the information terminal unit according to the present invention. In FIG. 2, there is shown a case where a cellular phase device is used as one embodiment of the information terminal unit according to the present invention.

Namely, the shown embodiment is constructed with a portable telephone unit 11, a mail server 12, a gate way 13, a switching equipment 14, radio base stations 15-1 to 15-3. It should also be noted that the reference numeral 16 denotes a received mail received by the portable telephone unit 11. The portable telephone unit 11 has the same construction as that of the information terminal unit shown in FIG. 1.

Operation of one embodiment of the information terminal unit according to the present invention will be discussed with reference to FIGS. 1 and 2. The portable telephone unit 11 obtains the HTML DATA (e.g. received mail 16) of the web site transmitted from the mail server 12 of a network through the gate way 13, the switching equipment 14 and the radio base station 15-2.

The portable telephone unit 11 stores the HTML DATA obtained from the mail server 12 in the memory 2. The control portion 1 of the portable telephone unit 11 reads out the HTML DATA stored in the memory 2 and displays on the display portion 6 via the display control portion 8. At this time, the control portion 1 controls the back light of the display portion 6 via the display back light control portion 7.

Figure 3A:
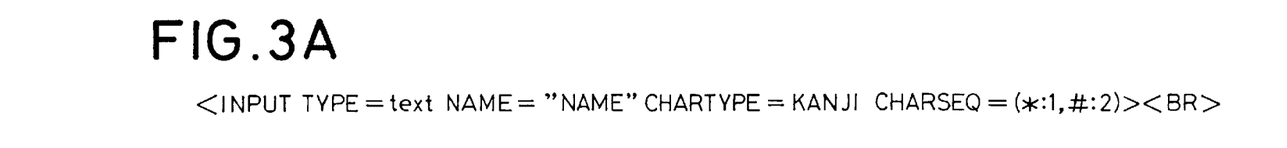
FIGS. 3A to 3E are illustrations showing examples of descriptions of HTML DATA , in which attribute of character input is designated.

FIGS. 3A to 3E are illustrations showing examples of expressions written by HTML DATA with designation of character input attribute. FIG. 3A shows character input attribute upon inputting "Name". In the example of FIG. 3A, an input type (INPUT TYPE) is text, name (NAME) is name, and a character type (CHARTYPE) is Japanese Kanji (Chinese) character. BR represents line break.

Figure 3B:
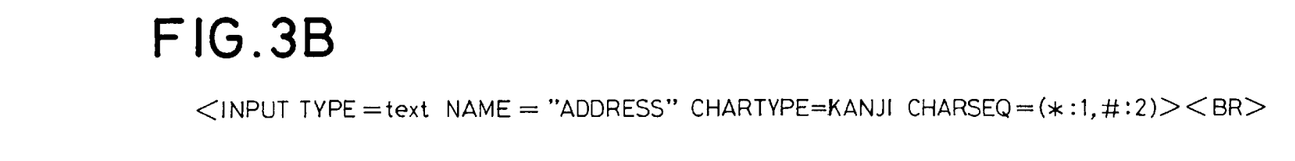
Figure 3C:
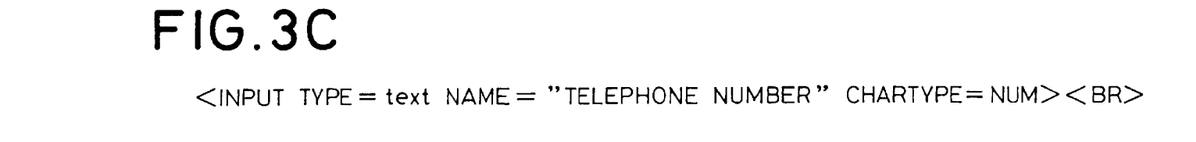

FIG. 3B shows character input attribute upon inputting "Address". In the example of FIG. 3B, an input type (INPUT TYPE) is text, name (NAME) is address, and a character type (CHARTYPE) is Japanese Kanji (Chinese) character. FIG. 3C shows character input attribute upon inputting "Telephone Number". In the example of FIG. 3C, an input type (INPUT TYPE) is text, name (NAME) is telephone number, and a character type (CHARTYPE) is number (NUM).

Figure 3D:
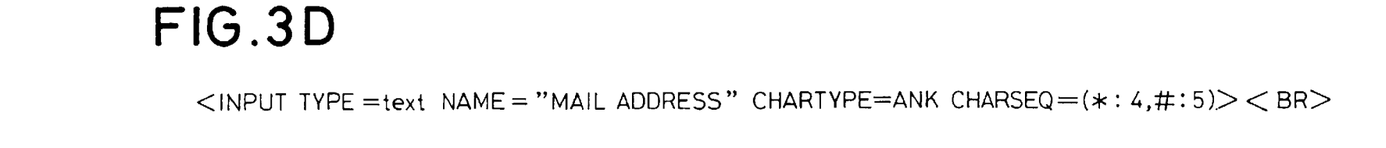
Figure 3E:
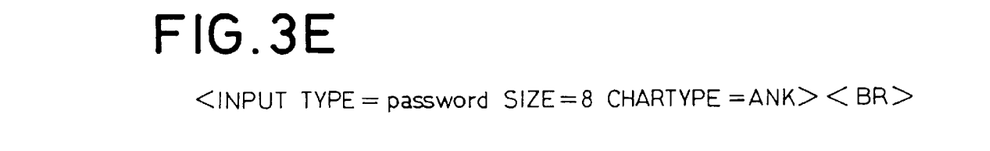

FIG. 3D shows character input attribute upon inputting "Mail address". In the example of FIG. 3D, an input type (INPUT TYPE) is text, name (NAME) is mail address, and a character type (CHARTYPE) is half size alphabet/number (ANK). FIG. 3E shows character input attribute upon inputting "Password". In the example of FIG. 3E, an input type (INPUT TYPE) is password, and a character type (CHARTYPE) is half size alphabet/number.

Figure 4:
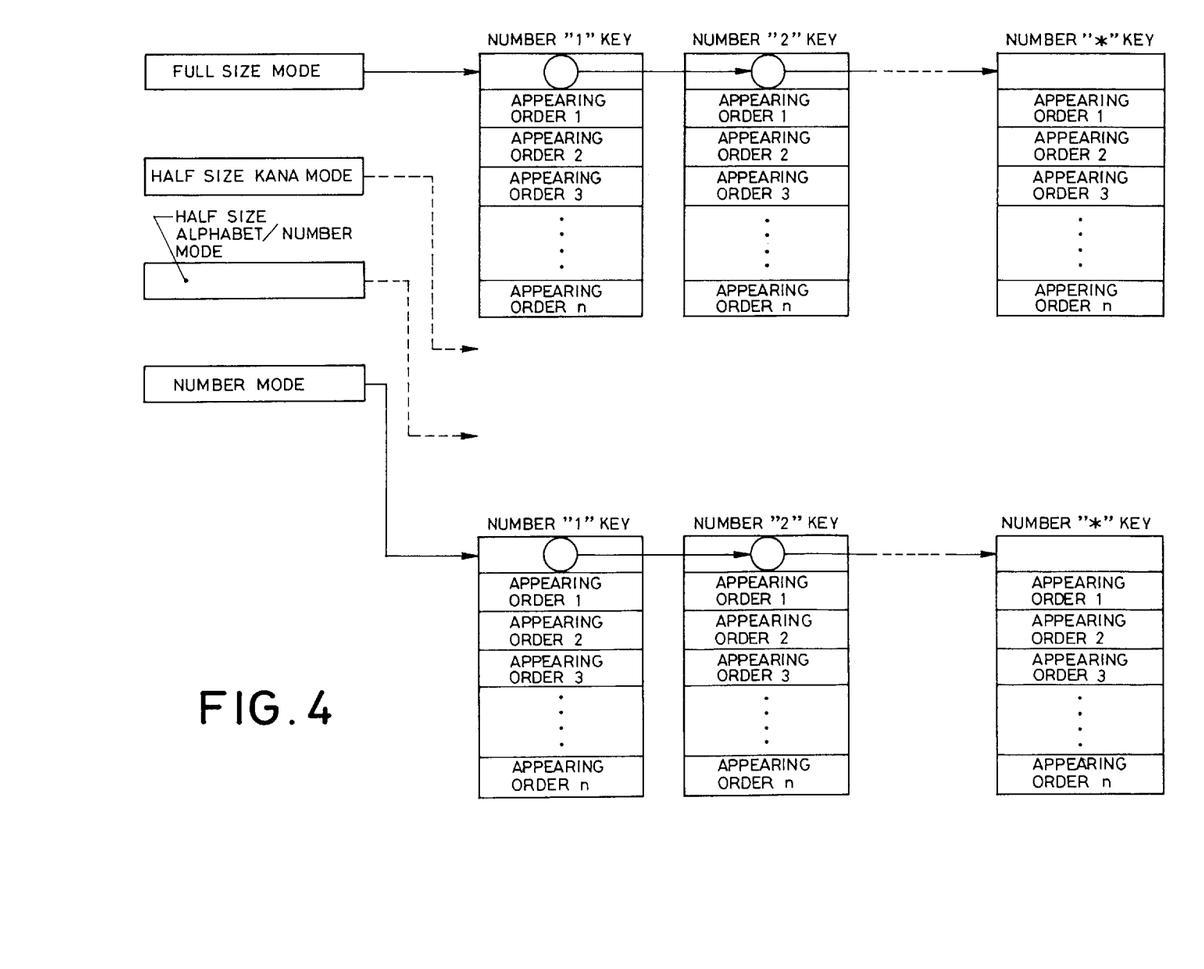
FIG. 4 is an illustration showing a management table, in which the order of appearance of the character is registered.

FIG. 4 is an illustration showing a management table, in which is registered the order of appearance of the characters. In FIG. 4, the management table stores the order of appearance 1 to the order of appearance n of the characters per each mode (full size mode, half size Japanese-Kana mode, half-size alphabet/number mode, number mode) and keys (numbers "1", "2", . . . , "*").

Figure 5:
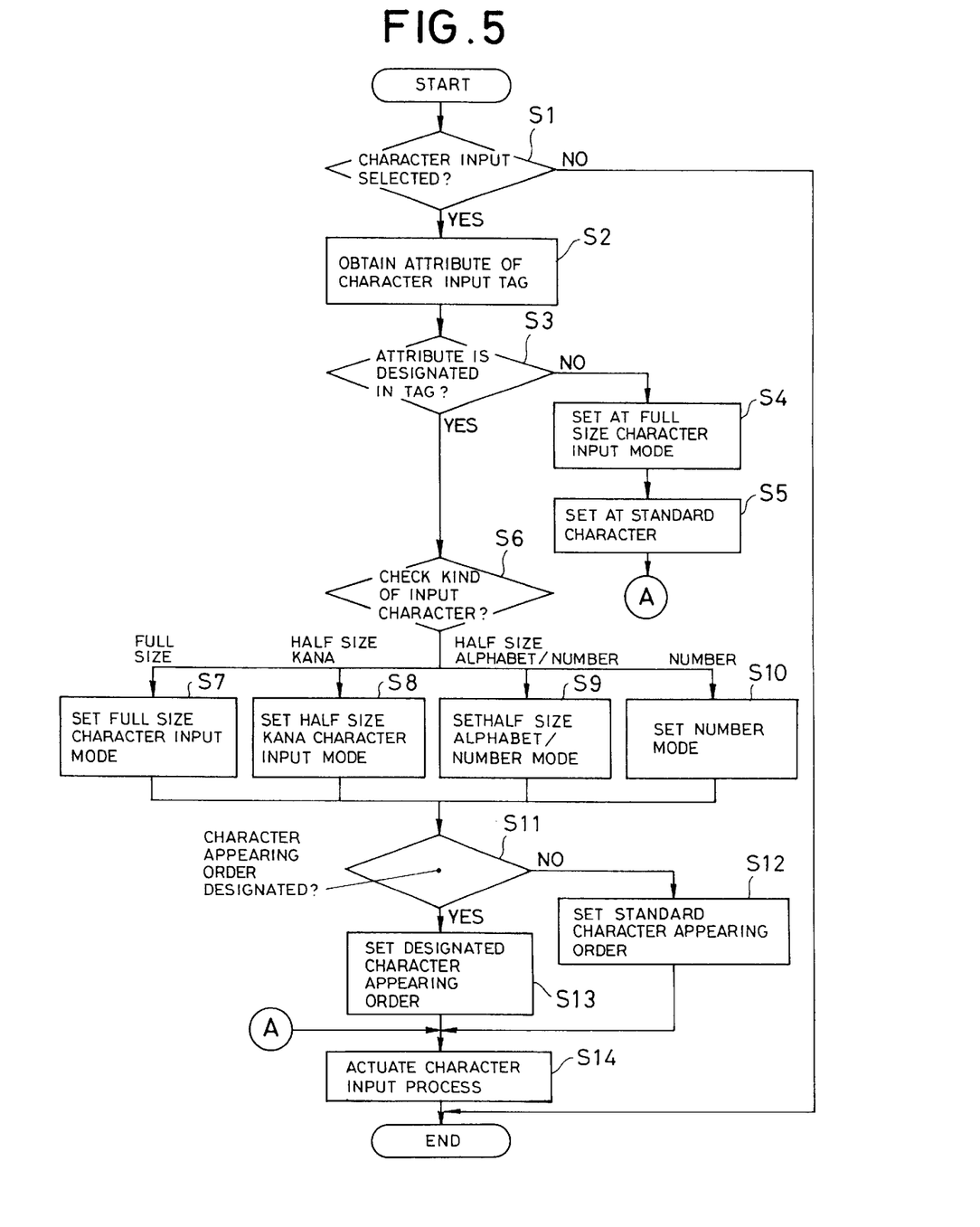
FIG. 5 is a flowchart showing a processing operation of a character input control by one embodiment of the present invention.

FIG. 5 is a flowchart showing a processing operation of character input control by one embodiment of the present invention. Discussion will be given hereinafter for operation relating to character input after parsing the HTML data with reference to FIGS. 1 to 5. It should be noted that the processing operation can be realized by executing the program recorded in the memory 2. It is also possible to use ROM (read-only-memory), IC (integrated circuit) memory and the like recording the program other than the memory 2.

The control portion 1 makes judgment whether character input process for the HTML data received by operation of the user of the portable telephone unit 11 is performed or not (step S1 of FIG. 5). In case of other than character input, the process is transited to a process designated by the user.

On the other hand, when the user selects the character input, the control portion 1 obtains attribute of the character input tag from the HTML data stored in the memory 2 (step S2 of FIG. 5). Then, judgment is made whether the attributes shown in one of FIGS. 3A to 3E are designed in the character input tag or not (step S3 of FIG. 5).

If the attribute is not designed in the character input tag, the control portion 1 sets the attributes at a predetermined value in the portable telephone unit 11. Namely, the control portion 1 sets the input to the full size character input mode through the key device 4 (step S4 of FIG. 5) for setting a standard order of appearance of characters (step S5 of FIG. 5).

When the attributes are designated in the character input tag, the control portion 1 makes judgment for the kind of the set input character (step S6 of FIG. 5) for setting the input mode adapted to the kind of the designated character. If the kind of the input character is "full size", the control portion 1 sets the input mode to the full size character input mode (step S7 of FIG. 5).

If the kind of the input character is "half size Kana", the control portion 1 sets the character input mode to the half size Kana character input mode (step S8 of FIG. 5). If the kind of the input character is "half size alphabet/number", the control portion 1 sets the character input mode to the half size alphabet/number character input mode (step S9 of FIG. 5). If the kind of the input character is "number", the control portion 1 is set at the numeric character input mode (step S10 of FIG. 5).

After setting of the character input mode, the control portion 1 checks whether the order of appearance of the input character is designated or not (step S11 of FIG. 5). If the order of the appearance of the input character is designated, reference is made to the management table shown in FIG. 4 in the memory 2. Then, the order of appearance of the character corresponding to the designated order is set (step anagemenS13 of FIG. 5).

If the order of appearance of the character corresponding to the designated order is not registered in the management table shown in FIG. 4, or if the order of the appearance of the input character is not designated, the control portion 1 sets the attributes at a predetermined value, in short, a standard order of appearance of characters in the portable telephone unit 11.

After determining the kind of the input character and the order of appearance of the input character, the control portion 1 activates the character input process (step S14 of FIG. 5). Then, the process transit to the character input state according to description of the HTML data.

As set forth above, in the shown embodiment of the portable telephone unit 11, upon performing the character input for the contents, the characters are displayed in the order of appearance adapting to the kind of the character adapted to the gist of the content described in the HTML data.

By utilizing the present invention, when the portable telephone unit has both of communication and browser functions, can obtain and parse HTML file, and can display the result of parsing on the display portion 6 of the portable telephone unit, even when the user performs operation with respect to the description relating to the character input in the obtained HTML data, the character input can be activated with the given kind of the character according to a setting in the portable telephone unit 11 irrespective of the content described in the HTML data. Therefore, upon performing input adapting to the gist of HTML data, it becomes unnecessary to require the judgment of the kind of the input character by the user and to perform the character input by switching the kind of the input character with the key.

On the other hand, upon performing the character input, the order of appearance of the character to be displayed in response to depression of the key is also constant in the portable telephone unit 11. Therefore, it becomes unnecessary to performing depression of the keys for a plurality of times up to appearing of the desired character.

Accordingly, upon inputting the character, it becomes possible to reduce number of times of operation of the key, such as depression of the key for switching the character adapting to the external factor, such as the HTML data or so forth or up to inputting of the desired character to lighten the load on the user.

As set forth above, according to the present invention, in the information terminal unit which obtains the file derived by a page description language used on the browser function on the superior device, employing the browser function, parses the page description language of the obtained file, and displays the result of parsing of the page description language, order of appearance of the characters to be displayed upon character input depending upon attribute of the kind of the input character designated by the character input tag used in the page description language, is controlled dynamically to reduce unnecessary operation of the user so that the desired character can be input with smaller key stroke.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, while the foregoing disclosure has been given for the case where inputting to the display portion of the portable telephone unit 11 adapting to the gist of the HTML data, the present invention is equally applicable for information terminal unit (e.g. portable information terminal or the like, in which the key is commonly used for different kinds of character input, such as number key and Kana key) employing the similar input method as the portable telephone unit. For instance, the invention is applicable for using page description language (e.g. XML (extensible Markup Language) or the like).

On the other hand, it is also possible to preliminarily store the program shown in FIG. 5 on a storage medium and read out the program to the control portion 1 from the storage medium to perform character input control according to the program.

What is claimed is:

1. An information terminal unit for obtaining a file described by a page description language used on a browser fiction on a superior unit by means of the browser function, parsing said page description language of the obtained file, and displaying a result of parsing of said page description language, comprising:

control means for dynamically controlling an order of appearance of display input characters in response to a key operation, depending upon an attribute of a kind of input character designated in a character input tag used in said page description language and in accordance with the number of times of a repeated key operation.

2. An information terminal unit as set forth in claim 1, wherein each key is used in common for character input of mutually distinct plurality of kinds of input characters.

3. An information terminal unit as set forth in claim 1, wherein said control means sets the order of appearance of the display input characters as designated response to a key operation when the order of appearance of the display input character is designated.

4. An information terminal unit as set forth in claim 1, wherein when the order of appearance of the display input characters in response to a key operation is not designated, said control means sets the order of appearance of the display input characters at a predetermined value.

5. An information terminal unit as set forth in claim 1, wherein actuation and termination of Japanese language input in response to a key operation are controlled dynamically, depending upon the received page description language.

6. A character input control method for obtaining a file described by a page description language used on a browser function on a superior unit by means of the browser function, parsing said page description language of the obtained file, and displaying a result of parsing of said page description language, comprising:

dynamically controlling an order of appearance of display input characters in response to a key operation, depending upon an attribute of a kind of input character designated in a character input tag used in said page description language and in accordance with the number of times of a repeated key operation.

7. A character input control method as set forth in claim 6, wherein each key is used in common for character input of mutually distinct plurality of kinds of input characters.

8. A character input control method as set forth in claim 6, wherein when dynamically controlling the order of appearance of display input characters in response to a key operation, the order of appearance of the display input characters is set as designated in response to a key operation when the order of appearance of the display input character is designated.

9. A character input control method as set forth in claim 6, wherein when dynamically controlling the order of appearance of display input characters in response to a key operation, the order of appearance of the display input characters is set at a predetermined value when the order of appearance of the display input characters in response to a key operation is not designated.

10. A character input control method as set forth in claim 6, wherein actuation and termination of Japanese language input in response to a key operation are controlled dynamically, depending upon the received page description language.

11. A storage medium recording a character input control program for obtaining a file described by a page description language used on a browser function on a superior unit by means of the browser function, parsing said page description language of the obtained file, and displaying a result of parsing of said page description language, comprising:

dynamically controlling an order of appearance of display input characters in response to a key operation, depending upon an attribute of a kind of input character designated in a character input tag used in said page description language and in accordance with the number of times of a repeated key operation.

12. A portable telephone unit for obtaining a file described by a page description language used on a browser function on a superior unit by means of the browser function, parsing said page description language of the obtained file, and displaying a result of parsing of said page description language, comprising:

control means for dynamically controlling an order of appearance of display input characters in response to a key operation, depending upon an attribute of a kind of input character designated in a character input tag used in said page description language and in accordance with the number of times of a repeated key operation.

13. A portable telephone unit as set forth in claim 12, wherein each key is used in common for character input of mutually distinct plurality of kinds of input characters.

14. A portable telephone unit as set forth in claim 12, wherein said control means sets an attribute of the kind of the input character at the corresponding to the designated attribute when an attribute is designated in said character input tag.

15. A portable telephone unit as set forth in claim 12, wherein said control means sets an attribute of the kind of the input character at a predetermined value when an attribute is not designated in said character input tag.

16. A portable telephone unit as set forth in claim 12, wherein said control means sets the order of appearance of the display input characters as designated in response to a key operation when the order of appearance of the display input characters is designated.

17. A portable telephone unit as set forth in claim 12, wherein when the order of appearance of the display input characters in response to a key operation is not designated, said control means sets the order of appearance of the display input characters at a predetermined value.

18. A portable telephone unit as set forth in claim 12, wherein actuation and termination of Japanese language input in response to a key operation are controlled dynamically, depending upon the received page description language.

19. A character input control method for a portable telephone unit for obtaining a file described by a page description language used on a browser function on a superior unit by means of the browser function, parsing said page description language of the obtained file, and displaying a result of parsing of said page description language, comprising:

dynamically controlling an order of appearance of display input characters in response to a key operation, depending upon an attribute of a kind of input character designated in a character input tag used in said page description language and in accordance with the number of times of a repeated key operation.

20. A character input control method for a portable telephone unit as set forth in claim 19, wherein each key is used in common for character input of mutually distinct plurality of kinds of input characters.

21. A character input control method for a portable telephone unit set forth in claim order 19, wherein when dynamically controlling the appearance of display input characters in response to a key operation, an attribute of the kind of the input character is set at the corresponding to the designated attribute when an attribute is designated in said character input tag.

22. A character input control method for a portable telephone unit as set forth in claim 19, wherein when dynamically controlling the order of appearance of display input characters in response to a key operation, an attribute of the kind of the input character is set at a predetermined value when an attribute is not designated in said character input tag.

23. A character input control method for a portable telephone unit as set forth in claim 19, wherein when dynamically controlling the order of appearance of display input characters in response to a key operation, the order of appearance of the display input characters is set as designated in response to a key operation when the order of appearance of the display input character is designated.

24. A character input control method for a portable telephone unit as set forth in claim 19, wherein when dynamically controlling the order of appearance of display input characters in response to a key operation, the order of appearance of the display input characters is set at a predetermined value when the order of appearance of the display input characters in response to a key operation is not designated.

25. A character input control method for a portable telephone unit as set forth in claim 20, wherein actuation and termination of Japanese language input in response to a key operation, are controlled dynamically, depending upon the received page description language.

26. A storage medium recording a character input control program for controlling character input to a portable telephone unit for obtaining a file described by a page description language used on a browser function on a superior unit by means of the browser function, parsing said page description language of the obtained file, and displaying a result of parsing of said page description language, said character input control program comprising:

dynamically controlling an order of appearance of display input characters in response to a key operation to said portable telephone unit, depending upon an attribute of a kind of input character designated in a character input tag use in said page description language and in accordance with the number of times of a repeated key operation.

* * * * *